United States Patent [19]

Bescherer et al.

[11] Patent Number: 5,062,390
[45] Date of Patent: Nov. 5, 1991

[54] BIRD FEEDER

[75] Inventors: Robert E. Bescherer, Bristol; Barry D. Colvin, Hope, both of R.I.

[73] Assignee: Aspects, Inc., Warren, R.I.

[21] Appl. No.: 617,343

[22] Filed: Nov. 23, 1990

[51] Int. Cl.⁵ ................................................. A01K 7/00
[52] U.S. Cl. ........................................ 119/72; 119/77; D30/125
[58] Field of Search ...................... 119/52.2, 52.3, 52.4, 119/72, 57.8, 57.9, 77; D30/121, 124, 125, 129

[56] References Cited

U.S. PATENT DOCUMENTS

| D. 234,615 | 3/1975 | Kilham | D30/125 |
| D. 236,139 | 7/1975 | Kilham | D30/125 |
| D. 239,182 | 3/1976 | Kilham | D30/125 |
| D. 252,288 | 7/1979 | Kilham | D30/125 |
| 3,913,527 | 10/1975 | Kilham | 119/77 X |
| 4,389,975 | 6/1983 | Fisher, Jr. | 119/52.3 |
| 4,691,665 | 9/1987 | Hefner | 119/57.9 |
| 4,901,673 | 2/1990 | Overstreet | 119/72 X |

Primary Examiner—Gene Mancene
Assistant Examiner—R. Thomas Price
Attorney, Agent, or Firm—Barlow & Barlow

[57] ABSTRACT

Feeder for birds, especially hummingbirds, that has a stem rising from the center of a bowl and that has a cover for the bowl through which the stem passes, which cover is selectively locked to the stem for loosening on occasion to permit filling of the bowl.

6 Claims, 2 Drawing Sheets

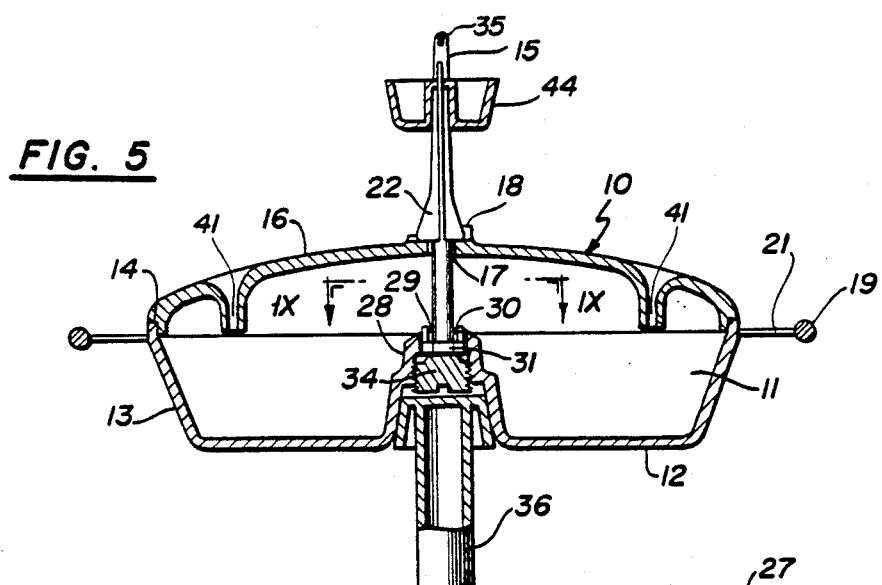
FIG. 5
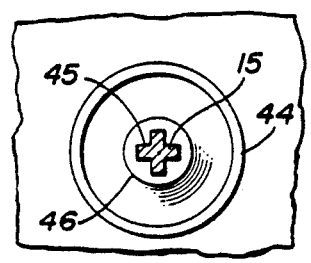
FIG. 6
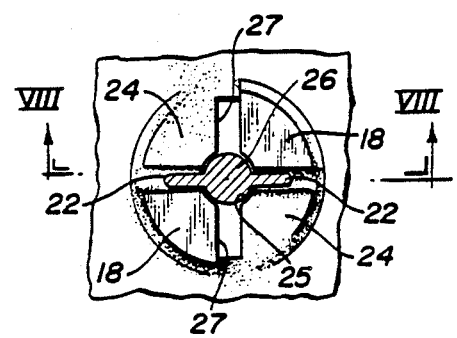
FIG. 7
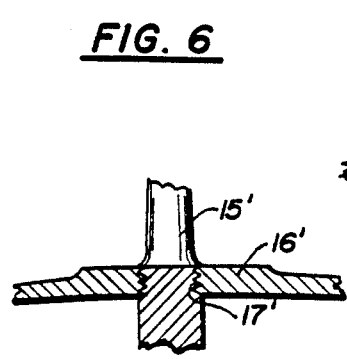
FIG. 8
FIG. 8A
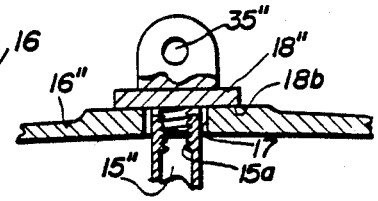
FIG. 8B
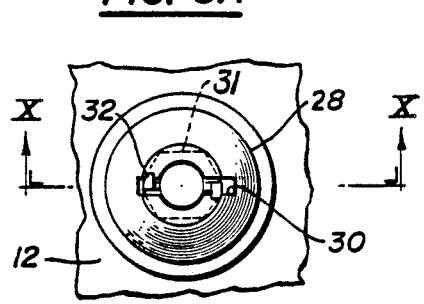
FIG. 9
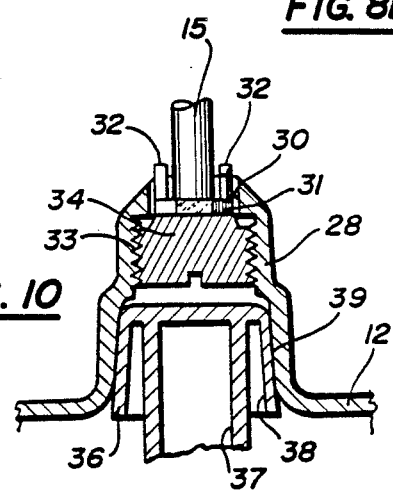
FIG. 10

BIRD FEEDER

BACKGROUND OF THE INVENTION

One of the most interesting of the bird family is the hummingbird, because it not only has an unusual appearance, but it has feeding and other activity habits that are fascinating to bird watchers. As is usual with bird fanciers, one of the best ways to observe birds is by attracting them to a feeder; when one specializes in a particular type of bird, it is the practice to select a feeding apparatus that is specially designed to attract that particular bird.

In the case of the hummingbird family of birds, the nature of the food dictates the general form that the feeder must take. The hummingbird feeds on the nectar from certain kinds of flowers. Now, this nectar consists, in general, of a sugar solution and the hummingbird, because of its high rate of metabolism, requires large amounts of this food.

In designing a hummingbird feeder, however, one must keep in mind that ants, bees, and other insects can be attracted to nectar when it is available to them. The principal way that hummingbird feeders can be constructed to restrict access to that particular bird takes into account the peculiar manner that the hummingbird feeds, i.e., by gathering the nectar through its elongated beak and tongue. For that reason, hummingbird feeders have in the past consisted of a container for the sugar solution to which access takes place solely through a small aperture. An example of such a feeder is shown on page 3 of THE HUMMINGBIRD BOOK, published by Little, Brown and Company; this feeder is manufactured by Heath Manufacturing Company, Coopersville, Mich., and consists of a transparent bowl having a cover which carries access openings. Feeders of this type are also shown in the patents to KILHAM No. 3,913,527, Des. 239,182, and Des. 252,288.

Generally speaking, there are three basic designs of hummingbird feeders: the tube bottle, the basin, and the basin bottle. The tube bottle and the basin bottle both function on the principle of an inverted bottle. In theory, the vacuum created at the top of the bottle prevents the liquid from draining out. In actual use, an increase in air temperature pushes more liquid out. A second problem is created in windy situations. If the feeder swings in an arc, the vacuum may be broken and allow the nectar to leak out.

The hummingbird feeders developed in the past have suffered from the defect that they have been difficult (if not impossible) to clean; if the nectar is not removed and the container completely cleaned, the danger arises that the nectar can ferment and generate chemicals or bacteria that are harmful to the hummingbird, particularly to the liver of the bird. Some of the prior art devices are integrally constructed, so that broken parts cannot be replaced. These and other difficulties experienced with the prior art devices have been obviated in a novel manner by the present invention.

It is, therefore, an outstanding object of the invention to provide a bird feeder that is particularly adapted to the feeding of hummingbirds.

Another object of this invention is the provision of a hummingbird feeder having a nectar reservoir that is easily cleaned to prevent dangerous fermentation.

A further object of the present invention is the provision of a bird feeder that is simple and rugged in construction, which can be manufactured from readily-available materials, and which is capable of a long life of useful service with a minimum of maintenance.

A still further object of the invention is the provision of a feeder for hummingbirds that is particularly attractive to them and that allows them to feed very comfortably.

It is a further object of the invention to provide a feeder that can be selectively mounted in either a hanging position or post-mounted position.

Another object of the invention is the provision of a feeder for hummingbirds that discourages feeding by ants.

With these and other objects in view, as will be apparent to those skilled in the art, the invention resides in the combination of parts set forth in the specification and covered by the claims appended hereto.

SUMMARY OF THE INVENTION

In general, the invention relates to a bird feeder having a bowl with a bottom wall and a side wall terminating in an upper edge, having an elongated stem extending upwardly from the center of the bowl, and having a cover lying over the upper edge of the bowl with a central aperture through which the stem extends. A locking means is associated with the stem and the aperture to fasten the cover to the stem and the bowl.

More specifically, the bird feeder has a perch ring which extends generally circumferentially of and is spaced outwardly from the upper edge of the bowl. Spokes extend from the bowl to the perch ring. One form of locking means consists of vanes extending from the stem having radial edges that engage corresponding cam surfaces located around the aperture in the cover. The aperture in the cover consists of a circular portion that fits closely around a cylindrical portion of the stem and of diametrically-opposed radial slots through which the vanes on the stem can pass.

Furthermore, the bottom wall of the bowl is circular and is formed with an integral central tube whose upper end has a closure that is formed with an opening through which the stem extends. The stem has a hexagonal button formed on its lower end to inhibit passage of the stem through the opening. The hexagonal button fits in a similarly-shaped socket under the closure to inhibit rotation of the stem relative to the bowl. The cover is provided with a plurality of feed entrances, each entrance having a smooth curved concave surface extending from a large outer end to a smaller inner end.

BRIEF DESCRIPTION OF THE DRAWINGS

The character of the invention, however, may be best understood by reference to one of its structural forms, as illustrated by the accompanying drawings, in which:

FIG. 5 is a vertical sectional view of the feeder taken on the line V—V of FIG. 3, FIG. 6 is a horizontal sectional view of the invention taken on the line VI—VI of FIG. 3, FIG. 7 is horizontal sectional view of the invention taken on the line VII—VII of FIG. 3, FIG. 8 is a vertical sectional view of the invention taken on the line VIII—VIII of FIG. 7, FIG. 8A is vertical sectional view, similar to FIG. 8, showing an alternative fastening, FIG. 8B is a vertical sectional view, similar to FIG. 8, showing a further alternative fastening, FIG. 9 is a horizontal sectional view of the invention taken on the line IX—IX of FIG. 5, and FIG. 10 is a vertical sectional view of the invention taken on the line X—X of FIG. 9.

DESCRIPTION OF THE PREFERRED EMBODIMENT

Figure 1:
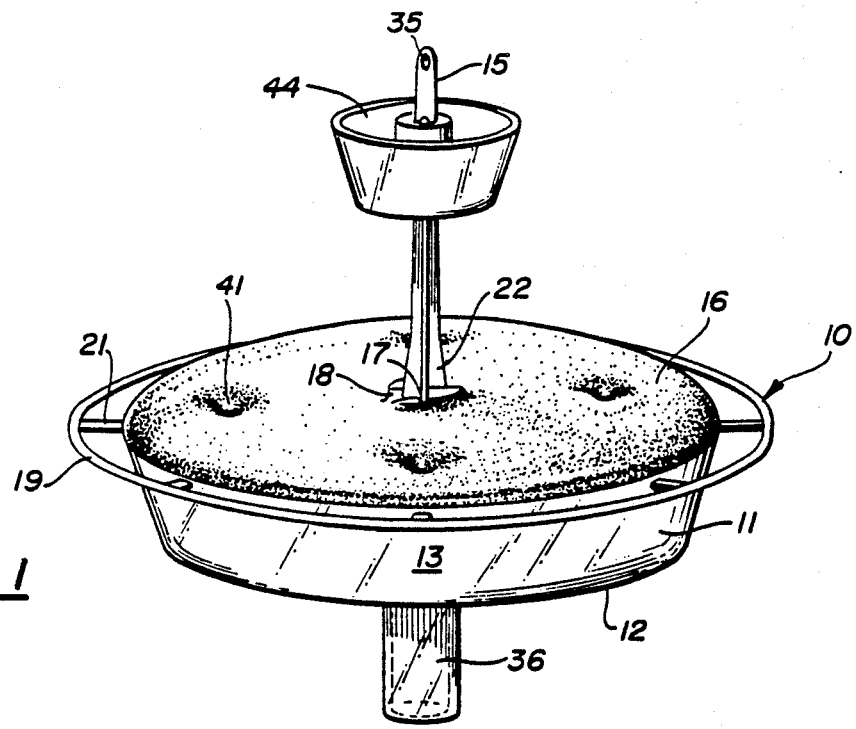
FIG. 1 is a perspective view of a bird feeder incorporating the principles of the present invention.
Figure 2:
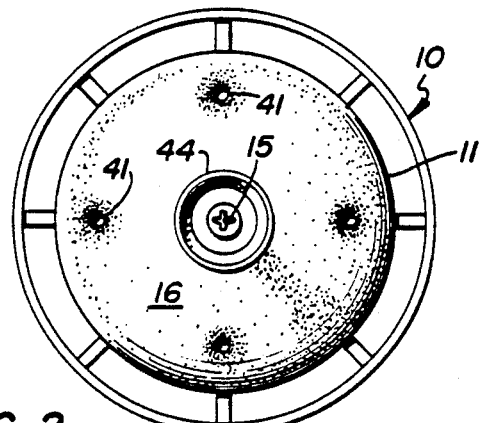
FIG. 2 is a top plan view of the feeder.
Figure 3:
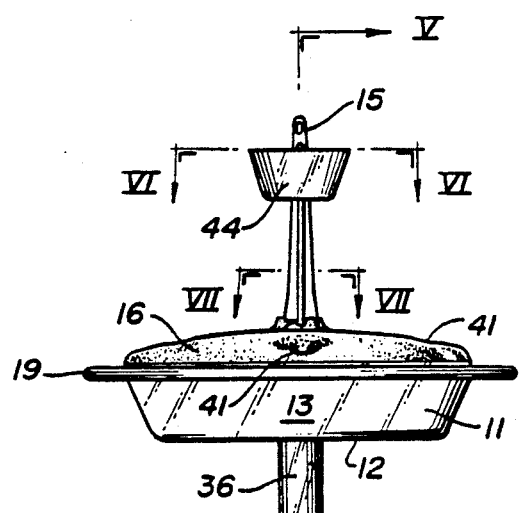
FIG. 3 is a front elevational view of the feeder.
Figure 4:
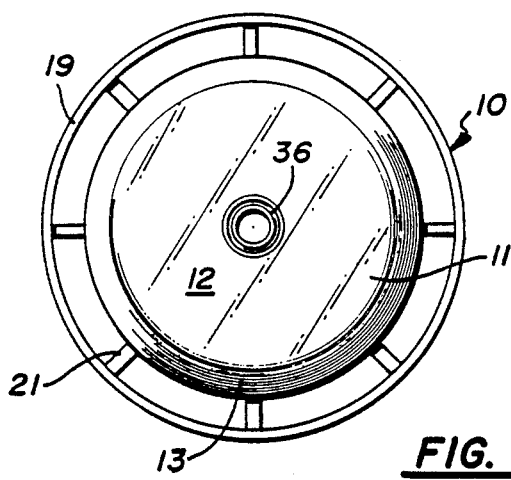
FIG. 4 is a bottom plan view of the feeder.

Referring first to FIGS. 1-5, which best show the general features of the invention, the bird feeder, indicated generally by the reference numeral 10, is shown as having a bowl 11 with a bottom wall 12 and a side wall 13 terminating in an upper edge 14 (FIG. 5). An elongated stem 15 extends vertically upwardly from the center of the bowl 11. A cover 16 lies over the upper edge 14 of the bowl and has a central aperture 17 through which the stem extends. The cover also is provided with feed entrances 41 and together with the bowl forms an enclosure for bird food.

A locking means 18 is associated with the stem and the aperture to fasten the cover to the stem and to the bowl. A rail or perch 19 extends generally parallel to and is spaced outwardly from the upper edge 14 of the bowl and spokes 21 extend from the bowl to the rail. An ant cup 44 is carried on the stem 15 and a post-mounting adapter 36 extends from the bottom of the bowl.

As shown in FIGS. 7 and 8, the locking means 18 consists of vanes 22 extending from the stem 15 having radial lower edges 23 that engage corresponding cam surfaces 24 located around the aperture 17. The aperture consists of a circular portion 25 that fits closely around a cylindrical portion 26 of the stem 15 and of diametrically-opposed radial slots 27 through which the vanes 22 on the stem 15 can pass.

As is evident in FIG. 5, the bottom wall 12 of the bowl is circular and is formed with an integral central tube 28 whose upper end has a closure 29 that is formed with an opening 30 through which the stem extends. The stem has a hexagonal button 31 formed on its lower end to prevent complete movement of the stem through the opening 30 and, by fitting in a hexagonal socket formed under the closure 29, prevents rotation between the stem and the bowl.

FIGS. 9 and 10 show further detail of the connection of the stem 15 to the bowl, including the fact that the button 31 has axial pegs 32 with teeth that engage slots in the opening 30 to prevent dropping of the stem relative to the bowl until a plug 34 has been installed to prevent dropping permanently. The interior surface of the central tube 28 is provided with threads 33 and the threaded plug 34 is located in the tube to lock the stem 15 to the bowl.

As is evident in FIG. 5, the upper end of the stem 15 is provided with a hole 35 to facilitate suspension mounting of the feeder 10.

FIG. 10 shows an adapter 36 that is provided for insertion in the central tube 28 of the bowl, the adapter having a bore 37 to permit mounting of the feeder on a vertical post; which may, for instance, be a $\frac{1}{2}''$ wood dowel. The lower end of the interior surface of the tube 28 has a frusto-conical concave bore 38 and the adapter 36 has a similarly-shaped convex surface 39 to fit snugly in the bore 38.

As is indicated in FIG. 5, the cover 16 is provided with a plurality of feed entrances 41, each entrance having a smooth, curved concave surface extending from a large outer end to a small inner end.

As shown in FIG. 6, the stem 15 has a non-circular cross-section 45 and an ant cup 44 is provided to be mounted on the stem and act as a barrier to crawling insects. The cup has a central tube with a closure at its upper end that is formed with a non-circular aperture through which the stem slides. The stem is tapered to jam in the aperture to locate the cup 44 at an intermediate location on the stem.

Referring to FIG. 8A, there is illustrated an alternate manner of securing the cover 16' to the body of the feeder. To this end, the stem 15, is externally threaded, while the aperture 17' is also threaded, so that the cover may effectively be spun onto the body or bowl 11. In FIG. 8B, the stem 15" is shortened and provided with an internal threaded bore 15a. In order to secure the cover 16", a cap 18" is provided with a threaded stem that engages the bore 15a. The lower surface 18b will engage the cover and hold the cover on the bowl 11 by engagement with the outer surface thereof.

In the preferred embodiment, the bowl 11 is formed by injection molding of a clear high-impact plastic material. The cover 16 is formed by injection molding of red-colored plastic. The adapter 36 is formed of clear plastic. The stem 15 is formed of clear polycarbonate, the ant cup 44 is formed of clear plastic and the plug 34 is formed by machining from a high-strength plastic material, such as acetal.

The operation and advantages of the invention will now be readily understood in view of the above description. To begin with, the feeder can be mounted as a suspension from above or at the top of a post. When suspended, a metal S-hook will be looped into the hole 35 at the upper end of the stem 15 This connector would be attached to a line extending upwardly to an overhead support. If, on the other hand, it is desired to mount the feeder at the top of a post, the adapter 36 is pressed into the lower end of the central tube 28 of the bowl 11. A $\frac{1}{2}''$ diameter post is driven into the ground in an accurately-vertical position and the upper end of the rod is carried in the bore 37 (FIG. 10) of the adapter. With either method of mounting, the feeder is reasonably free of access by the usual insects (such as ants) who tend to feed at and to clog up nectar-type feeders.

Before the feeder 10 is mounted, the bowl 11 is first filled with nectar. The recommended mixture is one part white table sugar to four parts of water. A sweeter mixture will harm the birds and, of course, no red dye or coloring should be used in the mixture; such coloring is not necessary, since the bright red cover 16 will attract the hummingbirds.

In order to fill the bowl with nectar, the cover 16 can be loosened by a simple turn and raised above the upper edge 14 of the bowl. When the nectar has been poured into the bowl, the cover is lowered, so that it rests on the upper edge of the bowl. At that time, the lower edges 23 of the vanes 22 on the stem rest on the ramps or cam surfaces 24. A quarter-turn rotation of the cover in the clockwise direction causes the vanes to slide upwardly on the cam surfaces and to pull the cover tightly downwardly on the upper edge 14 of the bowl. This also serves as the locking means 18 to hold the cover in place on the stem 15 and the bowl 11. The normal flexibility of the cover causes it to act as a spring to assist the vane-cam action.

With the nectar in place, the hummingbird will be attracted by the red color of the cover and will insert his elongated beak into a feed entrance 41, so that its smooth curved surface will serve to guide his beak into the nectar. While drinking the mixture, the bird may either hover or he may perch on the rail 19.

Because the only access to the nectar is through the 5 feed entrances 41, there is little possibility of competition from animals and other birds. Few birds have the necessary long narrow beak of the type that allow hummingbirds to reach through narrow passageways for food. The design and size of the entrances 41 serve to prevent access by bees and other flying insects. The ant cup 44 prevents ants from progressing down the stem 15 to the cover. It is very important to clean the feeder on a regular basis. In this way, fermentation of the nectar and poisoning of the hummingbirds can be prevented.

The desirable cleaning is readily carried out in the present invention; it is only necessary to rotate the cover in the counter-clockwise direction, so that the lower edges 23 of the vanes 22 move down the cam surfaces 24 until the vanes are aligned with the slots 27 of the central aperture 17. It is then possible to move the cover vertically and away from the bowl 11. The interior of the bowl can be easily emptied of any remaining nectar, the bowl can then be cleaned, and subsequently filled with fresh nectar. Occasionally, the feeder 10 can be de-mounted and completely dismantled for a thorough cleaning.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Hummingbird feeder comprising
   (a) a bowl having a bottom wall and having a side wall terminating in an upper edge,
   (b) an elongated stem having a lower end fixed to the center of the bottom of the bowl and extending upwardly therefrom,
   (c) a cover overlying the upper edge of the bowl and having a central aperture through which the stem extends, said cover with said bowl defining an enclosure and wherein said cover includes a plurality of feed entrances into the enclosure, and
   (d) a quick-release locking means associated with the stem and the aperture to fasten the cover to the stem and to hold the cover tightly on the upper edge of the bowl.

2. Bird feeder comprising
   (a) a bowl having a bottom wall and a side wall terminating in an upper edge,
   (b) an elongated support stem extending upwardly from the center of the bowl,
   (c) a cover lying over the upper edge of the bowl and having a central aperture through which the stem extends, and
   (d) a locking means associated with the stem and the aperture to fasten the cover to the stem and the bowl, wherein the locking means consists of vanes extending from the stem having radial edges that engage corresponding cam surfaces located around said aperture.

3. Bird feeder as recited in claim 1, wherein the aperture in the cover consists of a circular portion that fits closely around a cylindrical portion of the stem, the aperture also consists of diametrically-opposed radial slots through which the vanes on the stem can pass.

4. Bird feeder, comprising
   (a) a bowl having a bottom wall and a side wall terminating in an upper edge,
   (b) an elongated support stem extending upwardly from the center of the bowl,
   (c) a cover lying over the upper edge of the bowl and having a central aperture through which the stem extends, and
   (d) locking means associated with the stem and the aperture to fasten the cover to the stem and the bowl, wherein the bottom wall of the bowl is circular and is formed with an integral central tube whose upper end has a closure that is formed with an opening through which the stem extends, the stem having a button formed on its lower end to inhibit movement of the stem through the opening, the button having a hexagonal shape that engages a hexagonal socket in the opening to inhibit rotation of the stem relative to the bowl, wherein the interior surface of said central tube is provided with threads, and wherein a threaded plug is located in the tube in engagement with the threads to lock the stem positively to the bowl.

5. Bird feeder, comprising
   (a) a bowl having a bottom wall and a side wall terminating in an upper edge,
   (b) an elongated support stem extending upwardly from the center of the bowl,
   (c) a cover lying over the upper edge of the bowl and having a central aperture through which the stem extends, and
   (d) locking means associated with the stem and the aperture to fasten the cover to the stem and the bowl, wherein the stem has a non-circular cross-section, and wherein an ant cup is provided to be mounted on the stem, the cup having a non-circular aperture through which the stem slides, the stem being tapered to jam in said non-circular aperture to locate the cup at an intermediate location on the stem.

6. Bird feeder as recited in claim 5, wherein an adapter is provided for insertion in said central tube of the bowl, the adapter having a bore to facilitate mounting of the feeder on a vertical post, wherein a lower end of the interior surface of said central tube has a conical bore, and wherein said adapter has a similarly-shaped end to fit snugly in the bore.

* * * * *